March 22, 1966 W. H. COX 3,242,326
METHOD AND APPARATUS FOR THE ANALYSIS OF SEISMIC RECORDS
Original Filed Oct. 26, 1954 4 Sheets-Sheet 1

(1) $$A(t) = \frac{1}{2T} \int_{-T}^{T} f(t+\tau) G(\tau) d\tau$$

(2) $$A(t) \approx \frac{1}{2n} \sum_{K=-n}^{n} f(t+K\Delta t) G(K\Delta t)$$

INVENTOR.
WILLIAM H. COX
BY
ATTORNEYS

INVENTOR.
WILLIAM H. COX

March 22, 1966 W. H. COX 3,242,326
METHOD AND APPARATUS FOR THE ANALYSIS OF SEISMIC RECORDS
Original Filed Oct. 26, 1954 4 Sheets-Sheet 3

INVENTOR.
WILLIAM H. COX
BY
ATTORNEYS

March 22, 1966 W. H. COX 3,242,326
METHOD AND APPARATUS FOR THE ANALYSIS OF SEISMIC RECORDS
Original Filed Oct. 26, 1954 4 Sheets-Sheet 4

*INVENTOR.*
WILLIAM H. COX
BY
ATTORNEYS

United States Patent Office 3,242,326
Patented Mar. 22, 1966

3,242,326
METHOD AND APPARATUS FOR THE ANALYSIS OF SEISMIC RECORDS
William H. Cox, Beaumont, Tex., assignor to Sun Oil Company, Philadelphia, Pa., a corporation of New Jersey
Continuation of application Ser. No. 464,843, Oct. 26, 1954. This application June 29, 1959, Ser. No. 823,772
5 Claims. (Cl. 235—181)

This invention relates to methods and apparatus for the analysis of seismic records and has particular reference to the accentuation of reflections against background noise.

This application is a continuation of my application, Serial No. 464,843, filed October 26, 1954, now abandoned.

A major problem in seismic reflection geophysical exploration is that of recognition of reflection records against background noise. Filters are, accordingly, used since experience has shown that certain frequency bands are primarily involved in the desired signals and, consequently, by filtering the detected signals there is achieved some segregation of the desired signals from those which have frequencies outside the pass bands of the filters and are of no interest. Design of a conventional filter, however, necessarily involves a compromise since the desired signals actually contain a very broad band of frequencies and removal of any frequency components will also remove some components of the desired signal. In any event, filtering causes a substantial change in the waveform of the desired signals and reflections cannot be so readily recognized by those having experience in this art, since recognition is to a considerable extent by virtue of waveform. Furthermore, it is difficult to design a simple filter with the required amplitude versus frequency response which also has linear phase shift with frequency or zero delay distortion.

Recognition must also be given, in the design of filters, to the fact that the reflections which it is desired to detect are essentially transients. A filter which may appear satisfactory on a basis of frequency response and phase shift may be unsatisfactory due to poor transient properties. A poorly designed filter will produce essentially the same characteristic damped wave train output for any transient impulse applied to it. This "ringing" effect due to stored energy in reactive elements is present to some extent in any conventional filter.

Transient waveform distortion and phase or delay distortion are of major importance in recording apparatus used in geophysical exploration. These factors affect accuracy in measurement of the time of occurrence of seismic reflections. The need for a filter which will remove unwanted frequencies without producing time error will be apparent.

In accordance with the present invention there is provided a method of transient waveform analysis in which desired signals are separated from noise on the basis of wave shape or "character" instead of frequency content only. The nature of the invention may be briefly stated as follows:

On theoretical bases, there has been computed the waveform which should appear at a detector as the result of reflection in the earth of a pulse resulting from a shot. This computation of a wave shape is, of course, based on theoretical assumptions, but it does appear that what actually occurs in practice conforms reasonably with the theoretical.

In accordance with the present invention a record made by a seismograph is "scanned" against such a theoretical type of waveform, in the sense that the product of the amplitude of such waveform with a portion of the seismic record is integrated over a suitable interval to give rise to a derived record in which the reflections are accentuated. In effect, a "filtering" action is thus achieved with suppression of the components of the original record which are not of significance.

The foregoing will be made clearer in the following description read in conjunction with the accompanying drawings, in which.

Figure 1:
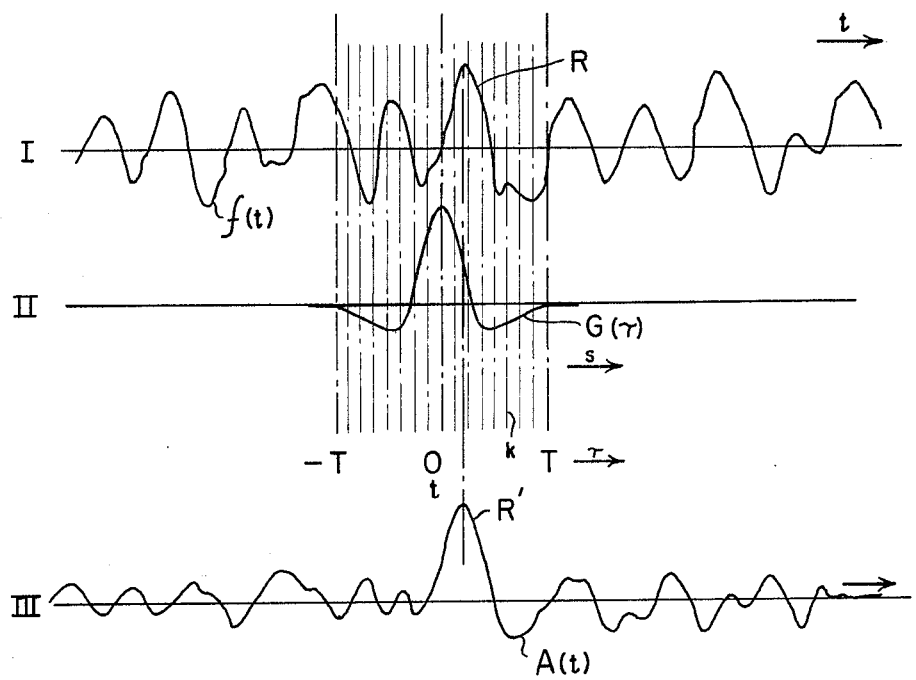
FIGURE 1 is a diagram illustrative of the method herein involved, FIGURE 1 also including a pair of formulae pertaining thereto.

The theoretical aspects of the invention may be best described with reference to FIGURE 1.

In this figure there is indicated at I a portion of a seismic record which is typical of that ordinarily secured at a detector. It may be assumed that this record indicates a reflection at R, but as will be evident this reflection is submerged in waves which would ordinarily make it difficult of recognition except by close comparison with companion records made by other seismographs in the same "spread." The record may be considered as a function of time as indicated, the progression of time being indicated by the arrow designated $t$.

There is indicated at II a waveform which will for convenience be hereafter referred to as a "wavelet." As shown, this wavelet has a form such as has been theoretically deduced to be that which would be produced by the signal from a shot reflected back to the surface from a subterranean reflecting boundary. A discussion of this type of wavelet will be found, for example, in the article "The Form and Nature of Seismic Waves and the Structure of Seismograms" by Norman Ricker, in Geophysics, 1940, page 348, volume 5. It will, of course, be understood that this wavelet is theoretical only, and tests and experiments may indicate that for certain generally known conditions encountered in practice the wavelet resulting from a reflected pulse may have substantially different shape. As will appear, the invention is not limited to the use of a particular shape of wavelet, but may involve the use of such wavelets as experience may show are more representative of the results of reflection with background noises eliminated. Generally, however, it can be expected that a wavelet thus produced would have a relatively short duration, involving only a limited number of positive and negative excursions with substantially zero values prior to and subsequent to a short interval. For present purposes it may be assumed that the wavelet has an essentially zero value prior to the time indicated at $-T$ and subsequent to the time indicated at $T$. As shown, it is symmetrical about the central time indicated at zero for the time scale, which zero of time may be considered to be the time $t$ of the wave at I. In accordance with the present invention, the wavelet shown in II may be considered as progressed in the direction of increasing time along the seismic record I. At each instant the integration of a product may be considered to take place as follows:

For each value of the wavelet, it may be considered that that value is multiplied by the amplitude of the seismic record at corresponding time, and that these products are integrated between the limits $-T$ and $T$, and the value of the integral is ascribed to a time $t$ corresponding to the zero position in the wavelet. The resulting integral, as a function of $t$, is indicated in curve III, and the value of this integral as a function of $t$ is expressed in the formula (1). The object of the present invention is broadly that of evaluation of the integral function expressed in (1) either accurately or sufficiently approximately for all practical purposes.

In the preferred form of the invention, the integral is approximated by a summation of the type indicated at (2). In other words, as is usual in mathematics for the approximation of a continuous integral, corresponding discrete values, individually indicated by the subscript $k$, of the two functions of I and II are multiplied together, and the sum of the individual products is taken, there being assumed to be $n$ of these products. The resulting summation, divided by $n$, then approximates the desired integral with a constant of proportionality. This summation procedure is indicated at (2).

It will be understood that hereafter when an integral is referred to there is intended to be indicated not only the true integral given in expression (1) but also the summation approximation given in (2), it being understood that a sufficient value of $n$ is used to secure the approximation practically necessary for satisfactory results.

Curve III indicates the integral such as will result from the mathematical process just outlined, there being indicated at R' an accentuated wave corresponding in its time $t$ to the reflection R of the original seismic record. In general, this resulting reflection record R' will be selectively accentuated with respect to the remaining portions of the curve III which may, in the figure, be considered as resulting from the integration of the wavelet with respect to the background noise of the original record.

The action thus resulting may be conveniently referred to as "filtering" with the understanding, however, that as that term is used herein with respect to the invention there is difference over conventional filtering, the filtering occurring in the case of the present invention being with respect to waveform rather than merely with respect to component frequencies. Being with respect to waveform, the filter action is well adapted to short duration non-recurrent signals. The analogy to filtering, however, will be apparent if there is considered, merely for purposes of understanding, the procedure involved in expression (1) applied to a continuous sine wave in a curve corresponding to I and a single cycle of a cosine wave as a wavelet utilized at II. It will be found that the response corresponding to III would then be a sine wave having the same phase as that of the original continuous sine wave. Such an integration would, of course, correspond to that normally involved in the ascertaining of the coefficients of a Fourier series, the integral being zero for all harmonics occurring in the original wave of the frequency involved in the sinusoidal wavelet. For frequencies other than harmonic frequencies there would, of course, be responses, but these are in general suppressed as compared with the value of the integral for corresponding or nearly corresponding frequencies of the wavelet and the original wave. It will be evident from the discussion just presented that the filtering action is essentially different from that provided by conventional wave filters having band pass characteristics. However, with respect to desired components, there is an action which may properly be considered that of filtering.

Figure 2:
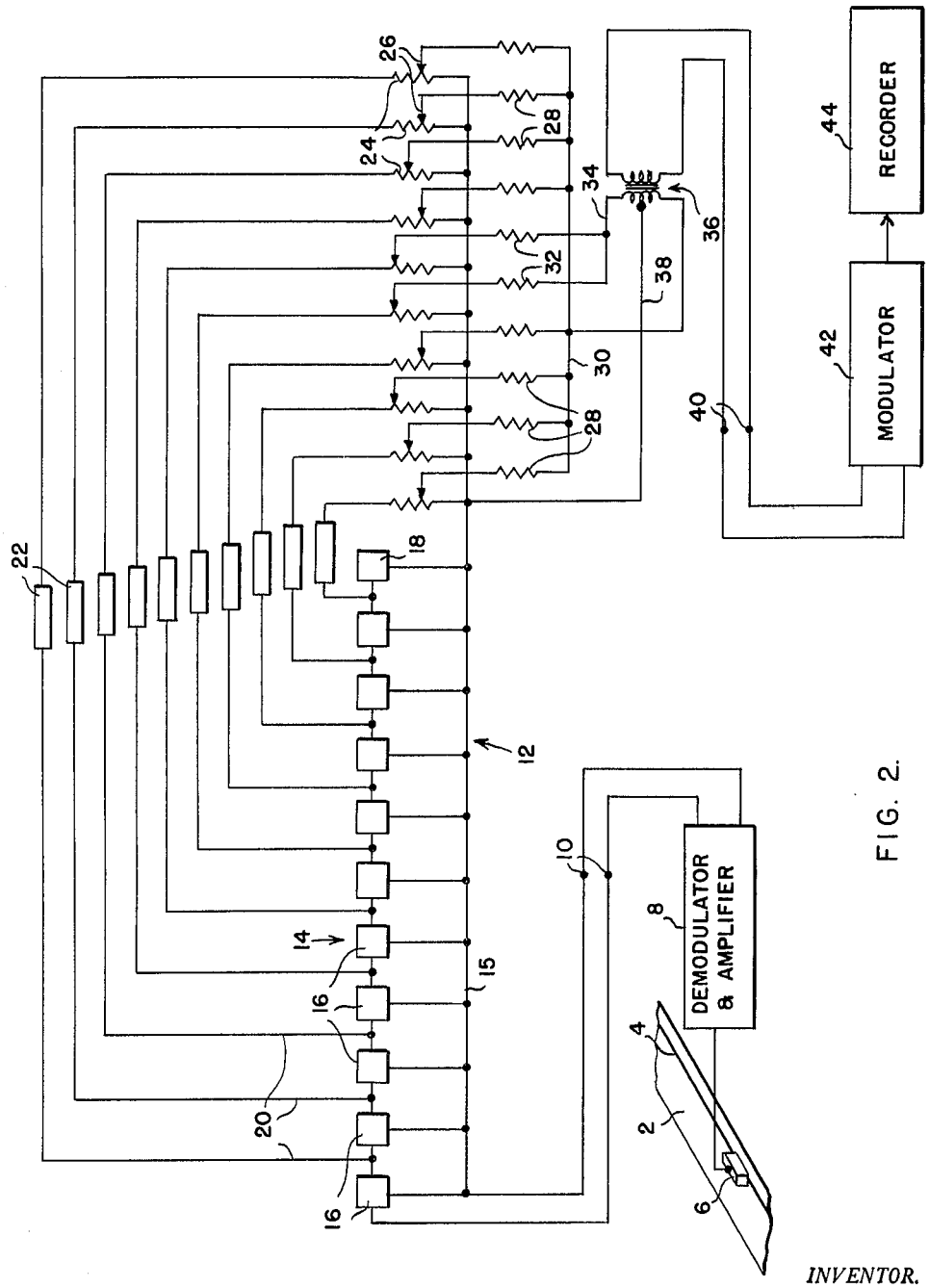
FIGURE 2 is a diagram showing a preferred form of apparatus used for carrying out the improved method.

FIGURE 2 shows a practical form of apparatus for carrying out the mathematical operations just described, this apparatus providing an approximation of the integral by summation, and being particularly adapted to magnetic recording.

In one highly desirable procedure in seismic prospecting, the outputs of the seismic detectors of an array are recorded side by side on a magnetic tape providing, usually, an individual recording channel for each detector, though, as will be presently mentioned, the recording may occur on a single tape channel. When channels individual to the detectors are provided, the seismic signal from each detector is fed to a modulator wherein it is caused to modulate a carrier having a frequency which is high relative to any frequencies occurring in the seismic signals. The purpose of this, aside from making better recordings, is to provide a record which may be subjected to successive reproductions for handling during analysis procedures. If a seismic signal is directly recorded at its own frequencies on a tape, the reproduction of that recording will not be of the original signal but will rather be of its first time derivative. If this signal, in turn, is recorded directly, its reproduction will involve the taking of another derivative, and so on. In the usual sound recording processes which utilize magnetic tapes, these successive differentiating steps are not of significance; but in the case of seismic recording the result is successive phase shiftings which are detrimental to the ascertainment of times of occurrence of particular events on the records after reproduction. However, if the seismic signals modulate a high frequency carrier, the time derivatives which occur are only those of the recorded modulated wave and the phase of the seismic envelope is essentially unchanged, whether the modulation is of amplitude or frequency type. The apparatus described, therefore, will assume that the original magnetic record is of a modulated carrier.

Recording to the outputs of a plurality of detectors on a single magnetic tape channel may be effected by modulation of individual carriers of different frequencies, the modulated carriers then being added together and recorded. Reproduction in such case involves separation of the modulated carriers by suitable filters followed by demodulation to recover the seismic signals.

There is indicated at 2 a magnetic tape which may be assumed to have either a plurality of channels or a single channel carrying the modulated carriers resulting from one of the recording procedures just indicated. A channel 4 is indicated thereon with which is associated a pick-up head 6, it being understood that if there was multiple channel recording there may be duplications of the pick-up and the connected apparatus, one for each channel, or if a number of signals are recorded on a single channel that a single pick-up would be used and interposed between it and the next apparatus there would be filtering to segregate a single channel. The output from the pick-up 6 is fed (either with or without filtering, as would be suitable for a particular case) to a demodulator and amplifier 8 of conventional type resulting in the production of an output at terminals 10 of the original seismic signal. The terminals 10 provide an input of this seismic signal to apparatus indicated generally at 12 which effects integration, by summation, in accordance with the invention. The apparatus 12 comprises a delay line generally indicated at 14 which is shown as comprising a ground line 15 and a series of delay elements 16 which may be of any conventional type to provide between them successive delays of the input from terminals 10. The delay line terminates in an impedance at 18 which has the characteristic impedance of the delay line to avoid reflection of signals traveling therethrough. The junctions of the sections 16 of the delay line are tapped by the connections 20 which lead to isolating devices 22 which in some instances may be relatively high resistances but which are, more desirably, isolating elements such as cathode followers which will receive and transmit the signals from the junctions without affecting the accurate delaying functions of the line. If desired, the elements 22 may also involve voltage amplification.

The outputs from the individual elements 22 are fed to attenuators 24 the adjustable contacts 26 of which are either connected through adding resistors 28 to a positive line 30 or through adding resistors 32 to a negative line 34. These lines 30 and 34 are connected to the opposite terminals of the primary of a transformer 36 the center tap of which is connected to the ground line 15 through line 38. The output from the secondary of the transformer 36 is fed to terminals 40 which are connected to the input of a modulator 42 wherein the signals at terminals 40 are caused to modulate a high frequency carrier to provide a modulated carrier to recorder 44 which may record the resulting modulated signal on another magnetic tape. In the event that it is desired at this stage to provide a photographic record for examination, the modulator 42 may be omitted, and the output signals from terminals 40 may be directly recorded in an oscillograph.

Instead of an electrical delay line such as is indicated at 14 there may be provided a delay line of mechanical or acoustic type, tapped at intervals by connections corresponding to 20.

Assuming that the delays of the individual sections 16 are equal, the tapped connections 20 and the attenuators 24 will have the number $n$ required for summation. The wavelet involved in the integration is set into the attenuators 24 by suitable placement of their adjustable contacts 26, each providing a voltage division corresponding to the ordinate of the wavelet II at a corresponding point of sampling. The positive ordinates are set by such adjustment and connection to the positive line 30, while the negative ordinates are similarly set but by connection to the negative line 34. As will be evident, at any instant of time, say that indicated at $t$ in FIGURE 1, there will be fed from the taps between the delay line sections values of the input signal corresponding to the time increments defined by $k$ in FIGURE 1. The result will be that from each attenuator there will be provided an output of the product of the corresponding ordinates of the curves I and II. These are then added, with suitable account being taken of sign through the resistors 28 and 32 with the result that the integral summation is provided at terminals 40 corresponding to the curve III in FIGURE 1. The resulting record, therefore, is that produced by the "filtering" action in accordance with the present invention, the reflections being accentuated as at R' if a suitable choice of wavelet has been made for the conditions involved.

By duplications of the apparatus described, or by repeated recording in different channels of the final tape, there will be produced records corresponding to the original seismic records of a detector array but having been subjected to the filtering action in accordance with the invention. These records may then be either reproduced for visual inspection photographically or may be subjected to various manipulations involving further filtering, time delays, time rearrangements for step-outs, weathering corrections, etc., as, for example, described in detail in the patent of Bazzoni, Ellis and Winterhalter No. 2,940,536.

Figure 3:
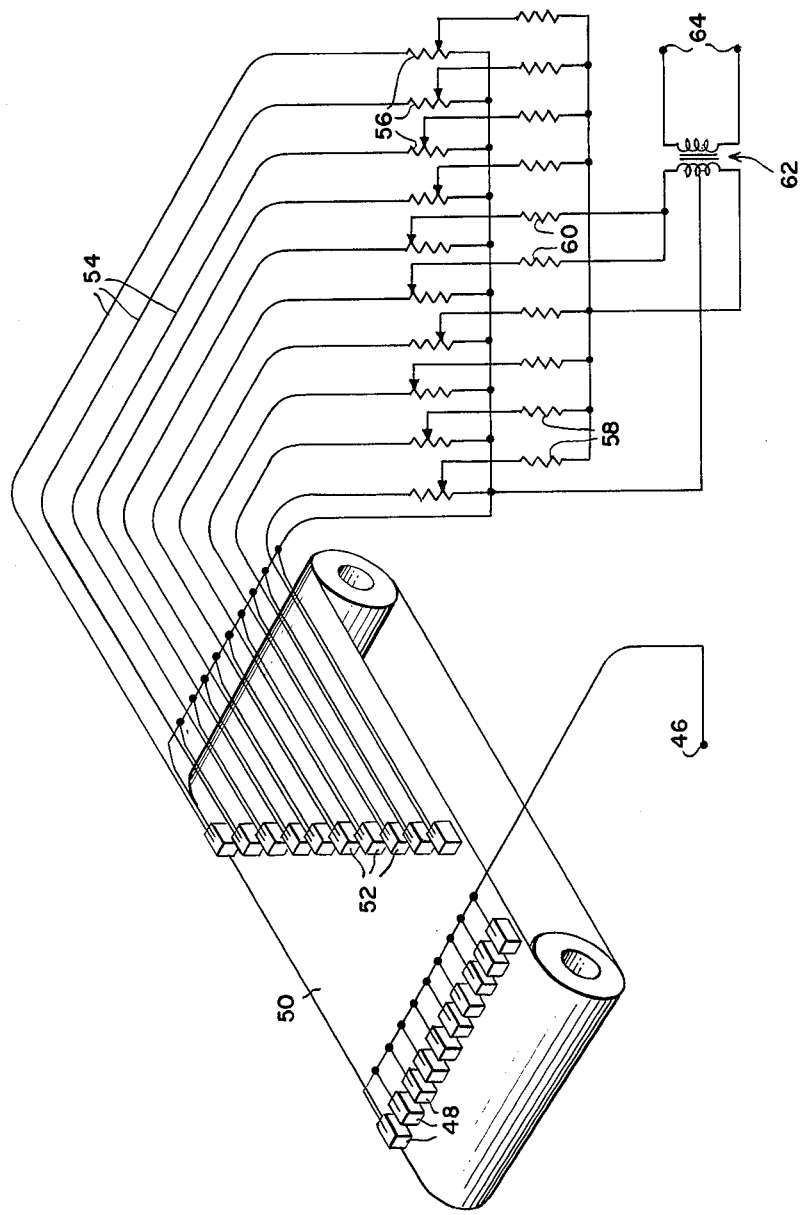
FIGURE 3 is a diagram showing an alternative form of apparatus for carrying out the method.

Reference may now be made to FIGURE 3 which shows another form of apparatus suitable for securing the same results.

In accordance with this figure, the signal of a single seismic channel in the form of a signal at seismic frequencies or a modulated carrier from an original tape such as 2 of FIGURE 2 is fed to the input terminal 46 which is connected to a series of combination erasing and recording heads 48 arranged to record on side by side channels on a magnetic tape 50 which is driven continuously in the direction of the arrow. This drive should be at a constant predetermined speed. A series of pick-ups 52 is provided, one pick-up for each channel, the pick-ups being arranged in staggered relationship so as to provide different time delays between the instants of recording and of pick-up on the tape 50. The outputs from these heads 52 are delivered through connections 54 which correspond to the connections 20 in FIGURE 2 (and would contain individual demodulators if the input at 46 consisted of a modulated carrier) and, in fact, from this point on in the apparatus it may be identical with what has been described in FIGURE 2, the connections 54 being to the attenuators 56 into which the wavelet is entered by adjustment of their contacts, the outputs from the attenuators being added in resistors 58 and 60 corresponding to resistors 28 and 32 and being fed to the transformer 62 which provides an output to terminals 64 which may be connected through a modulator to a magnetic recorder or, alternatively, directly to a photographic oscillograph. It will be evident that the general operation of the apparatus disclosed in FIGURE 3 is the same as that disclosed in FIGURE 2, time delays being provided, however, through the mechanical delay involved by reason of the motion of tape 50 and the placement of the pick-ups 52. It will be evident that the recording heads 48 may be located diagonally across the tape with the pick-up heads 52 directly across the same, if desired.

It should be noted that if modulated carrier signals are not involved, for example on the tape 2 or 50, the signals being instead at seismic frequencies, and the picked up signals are, therefore, time derivatives, the procedures involved are nevertheless applicable, the wavelet against which integration is effected being then chosen to correspond, e.g. being the time derivative of the wavelet shown in II. The reflections will be correspondingly accentuated.

The foregoing devices approximate the integral given in (1) in FIGURE 1 by summation of the type indicated at (2). With the value of $n$ sufficiently high, the integral may be approximated to any desired degree of accuracy. However, the true continuous value of the integral may be secured in various fashions, not only by multiplication and integration electronically, but by various optical systems as, for example, illustrated in FIGURE 4.

In accordance with this figure, a push-pull seismic record 68 is provided photographically on a motion picture film 66 using conventional recording methods. A lamp 70 through a condenser 72 provides illumination of a portion of the film as it advances, and an image of the record on the film is projected by means of a lens system 74 on a mask which comprises at 76 and 78 push-pull variable density representation of the wavelet involved in the product and integration. The illumination passing the mask is picked up by a photocell 80 which is conventionally illustrated in circuit with a battery 82 and transformer 84 to provide an output to the terminals 86 which may be connected to a recorder, either magnetic or photographic, in which the record medium is advanced in synchronism with the film 66. It will be evident that the light reaching the photocell 80 will, at any instant, be proportional to the integral of the product of the corresponding portions of the record 68 and the mask 76, 78, with the result that the output is proportional to the integral given at (1) in FIGURE 1. Continuous integration is thus secured. It will be evident that numerous other optical systems may be used for recording, involving variable width or variable density recordings, or there may be utilized similarly phosphorescent images provided on a tape and involving temporary records of the seismic signals. Various optical masking means may also be used to provide the product of the seismic record and the wavelet required for the integration.

In general, push-pull modulation must be used in optical systems to make possible recording of positive and negative signal variations with cancellation of the steady component. Inclusion of steady (carrier) components in either the recorded signal or in the analyzing optical mask would produce undesired integral components in the output.

Figure 4:
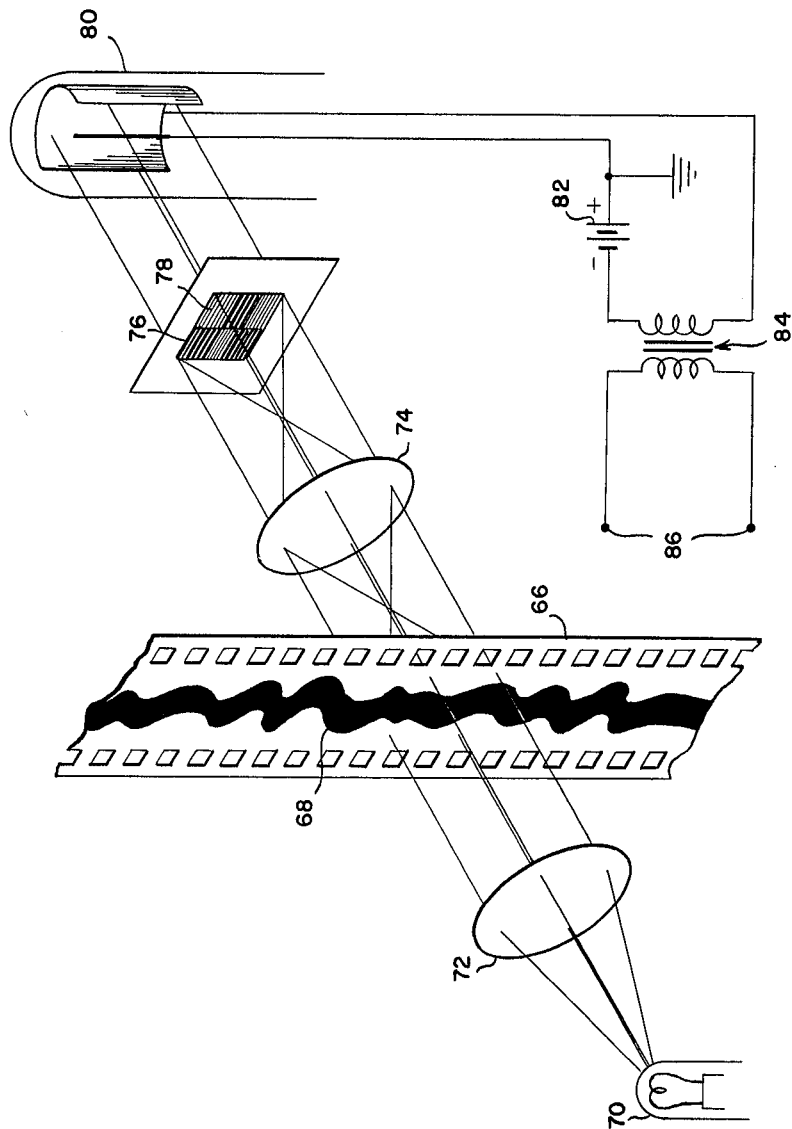
FIGURE 4 is a diagram showing apparatus for carrying out the method in an optical fashion.

It may be noted that without electrical means the arrangement in FIGURE 4 may provide a variable density record of the integral by providing beyond the mask 76, 78 a cylindrical lens which will converge the illumination passing through the mask to a single transverse line past which a photographic film may move in synchronism with the film 66. From such a variable density record any desired final record may then be produced in conventional fashion.

It will be clear from the above that numerous types of apparatus may be provided for the securing of the integration discussed.

It will be evident, furthermore, that the invention is not limited to the analysis of seismic records, but may be applied in other fields where it is desired to provide "filtering" of the type herein described by providing an integral of a product of a waveform and a predetermined wavelet. In particular, the invention is applicable to the picking out of transients from a continuous waveform when such transients are substantially submerged in irrelevant signals or noise. In any such case, the particular wavelet chosen for the analysis should be that suitable for the purpose and recognized either as that theoretically to be secured or derived from practical work. The incoming signal to be subjected to analysis, furthermore, need not necessarily be derived from a recording but may have its origin in some operating or detecting apparatus.

In accordance with the above, therefore, it is to be understood that the invention is of broad scope and not to be considered limited except as required by the following claims.

What is claimed is:

1. The new use, for analysis of a seismic waveform varying with time, of an apparatus which provides at any instant an output comprising products of corresponding values of a waveform and of a predetermined wavelet, means summing said products over a predetermined time period of the waveform, said summation being continuously carried out to provide a continuous integral output, and means recording said integral output as a function of the time scale of said waveform, said new use involving introducing a seismic waveform to the apparatus as the waveform involved and adjusting the apparatus to provide as the wavelet one having the form of an expected reflection of a seismic wave.

2. The new use, for analysis of a seismic waveform varying with time, of an apparatus which provides simultaneously a plurality of outputs each of which represents the value of a waveform at a predetermined different instant of time, means receiving said outputs and multiplying each by a predetermined individual constant proportional to the amplitude of a corresponding instantaneous portion of a wavelet to provide product outputs, means receiving said product outputs and summing them to provide a summed output, and means for recording said summed output as a function of the time scale of said waveform, said new use involving introducing a seismic waveform to the apparatus as the waveform involved and adjusting the apparatus to provide as the wavelet one having the form of an expected reflection of a seismic wave.

3. The new use, for analysis of a seismic waveform varying with time, of an apparatus which provides simultaneously a plurality of outputs each of which represents the value of a waveform at a predetermined different instant of time, means comprising a plurality of attenuators individual to said outputs receiving said outputs and multiplying each by a predetermined individual constant, thereby to provide product outputs, means receiving said product outputs and summing them to provide a summed output, and means for recording said summed output as a function of the time scale of said waveform, said new use involving introducing a seismic waveform to the apparatus as the waveform involved and adjusting said attenuators so that each individual constant is proportional to the amplitude of a corresponding instantaneous portion of an expected reflection of a seismic wave.

4. The new use, for analysis of a seismic waveform varying with time, of an apparatus comprising a tapped delay line providing simultaneously a plurality of outputs each of which represents the value of a waveform at a predetermined different instant of time, means receiving said outputs and multiplying each by a predetermined individual constant to provide product outputs, means receiving said product outputs and summing them to provide a summed output, and means for recording said summed output as a function of the time scale of said waveform, said new use involving introducing a seismic waveform to the apparatus as the waveform involved and adjusting the apparatus to provide as each individual constant the amplitude of a corresponding instantaneous portion of an expected reflection of a seismic wave.

5. The new use, for analysis of a seismic waveform varying with time, of an apparatus comprising a tapped delay line providing simultaneously a plurality of outputs each of which represents the value of a waveform at a predetermined different instant of time, means comprising a plurality of attenuators individual to said outputs receiving said outputs and multiplying each by a predetermined individual constant to provide product outputs, means receiving said product outputs and summing them to provide a summed output and means for recording said summed output as a function of the time scale of said waveform, said new use involving introducing a seismic waveform to the apparatus as the waveform involved and adjusting said attenuators to provide as each of said individual constants the amplitude of a corresponding instantaneous portion of an expected reflection of a seismic wave.

References Cited by the Examiner

UNITED STATES PATENTS

| | | | |
|---|---|---|---|
| 2,179,000 | 11/1939 | Tea | 88—14 |
| 2,243,730 | 5/1941 | Ellis. | |
| 2,643,819 | 6/1953 | Lee et al. | 235—181 |
| 2,676,206 | 4/1954 | Bennett et al. | 235—181 X |
| 2,794,965 | 6/1957 | Yost | 340—15 |
| 2,801,351 | 7/1957 | Calvert et al. | 307—149 |
| 2,839,149 | 6/1958 | Piety. | |
| 2,885,590 | 5/1959 | Fuller | 235—181 X |

MALCOLM A. MORRISON, *Primary Examiner.*

ABRAHAM BERLIN, LEO SMILOW, CORNELIUS D. ANGEL, *Examiners.*